UNITED STATES PATENT OFFICE.

HYACINTH GIRARD, OF DUBUQUE, IOWA.

INCRUSTATION-PREVENTIVE.

SPECIFICATION forming part of Letters Patent No. 310,410, dated January 6, 1885.

Application filed July 29, 1884. (No specimens.)

*To all whom it may concern:*

Be it known that I, HYACINTH GIRARD, of the city and county of Dubuque, and State of Iowa, have discovered a new and useful Improvement in the Process of Preventing the Incrustation in Steam-Boilers; and I hereby declare that the following is a full and exact description of the ingredients and manner of using the same.

The object of the invention is to prevent the precipitation of lime and other substances in the water of steam-engine boilers, thus forming incrustations on the inside of the same, which prevents the free radiation of the heat through the boiler. This I accomplish by taking what are known as ordinary "malt-sprouts" and distilling them with steam. The product of such distillation I mix with the water-supply of the boiler, preferably in the tank of a locomotive-boiler, using about a pint of such product to one thousand gallons of water, more or less, according as there is more or less lime or other substances in the water used. This product of distillation thus placed in the water "softens" the same, and prevents the lime from precipitating and forming the incrustations on the inside of the boiler.

I can also mix with the sprouts ground, sliced, or mashed potatoes, or carrots, or beets, turnips, and such like vegetables, and then distill the same; but I find the best results from using the sprouts alone and distilling them as above shown.

I am aware that barley-sprouts have been placed in boilers for the same purpose; but they clog the boiler and have to be often cleaned out. They also settle in various parts of the boiler and prevent the radiation of heat, and are practically useless.

Having thus described my invention, what I claim is—

The process of removing or preventing incrustation in steam-boilers, which consists in distilling malt-sprouts and adding the resultant liquor to the water in the boiler, substantially in the manner and proportions described.

In testimony whereof I have affixed my signature in presence of two witnesses.

HYACINTH GIRARD.

Witnesses:
M. W. GRAHAM,
MONROE M. CADY.